United States Patent [19]

Hamanishi

[11] 4,395,094
[45] * Jul. 26, 1983

[54] LARGE APERTURE RATIO PHOTOGRAPHIC LENS WITH MEANS FOR CORRECTING ABERRATIONS

[75] Inventor: Yoshinari Hamanishi, Tokyo, Japan
[73] Assignee: Nippon Kogaku K.K., Tokyo, Japan
[*] Notice: The portion of the term of this patent subsequent to Apr. 7, 1998, has been disclaimed.
[21] Appl. No.: 222,539
[22] Filed: Jan. 5, 1981
[30] Foreign Application Priority Data Jan. 31, 1980 [JP] Japan .................................. 55/10703

[51] Int. Cl.³ .................... G02B 9/62; G02B 15/14
[52] U.S. Cl. .................................................. 350/467
[58] Field of Search ........................................ 350/467

[56] References Cited
U.S. PATENT DOCUMENTS 3,815,974  6/1974  Momiyama .
3,923,369  12/1975  Nakamura ........................ 350/458
4,260,223  4/1981  Hamanishi ........................ 350/467

*Primary Examiner*—John K. Corbin
*Assistant Examiner*—Rebecca D. Gass
*Attorney, Agent, or Firm*—Shapiro and Shapiro

[57] ABSTRACT

This specification discloses a large aperture ratio photographic lens with means for correcting aberrations comprising a forward group including at least one negative lens and having a composite positive refractive power, a rearward group also including at least one negative lens and having a composite positive refractive power, and a diaphragm provided between the two groups, characterized in that during the shift from an infinity object photography condition to a short distance object photography condition, focusing is effected by moving both of the two groups toward the object side while enlarging the diaphragm space between the two groups and that the photographic lens satisfies predetermined conditions.

8 Claims, 12 Drawing Figures

LARGE APERTURE RATIO PHOTOGRAPHIC LENS WITH MEANS FOR CORRECTING ABERRATIONS

BACKGROUND OF THE INVENTION

1. Field of the Invention

This invention relates to a large aperture ratio photographic lens which has a standard angle of view and yet in which the photographing near distance is shorter than that in ordinary lenses.

2. Description of the Prior Art

In most of conventional large aperture ratio lenses, aberration correction is effected with infinity photography as the standard and, as is known, the imaging performance is significantly deteriorated during short distance photography, and as the aperture ratio increases, various aberrations fluctuate greatly. In practical use, the photographing magnification during near distance photography has been of the order of 1/10 and, particularly, in the case of a large aperture ratio lens, it has been difficult to say that the performance during open photography is sufficient even at such degree of magnification. To prevent such deterioration of the imaging performance, various types of so-called floating systems for correcting aberrations in which partly different movements are effected within the lens system during short distance photography have been adopted instead of the conventional so-called whole axial movement system, whereby the fluctuations of various aberrations during a short distance photography condition can be reduced and the photographing distance can be made shorter than in the case of the whole axial movement system. However, some of these known floating systems have generally had complicated constructions and some of them have involved movement of the lens which is difficult to carry out for higher magnification photography. Even in some of them which are simple in construction, the deterioration of the image resulting from chromatic aberration has been severe and, particularly, in the case of a large aperture ratio, the photographing distance has been prevented from being shortened.

SUMMARY OF THE INVENTION

It is an object of the present invention to provide a large aperture ratio photographic lens for use with a single lens reflex camera which has a standard angle of view and yet in which the deterioration of chromatic aberration and various aberrations during a short distance photography condition is small and the photographing near distance is shorter than that in the conventional lenses.

The invention will become fully apparent from the following detailed description taken in conjunction with the accompanying drawings.

DESCRIPTION OF THE PREFERRED EMBODIMENTS

In a large aperture ratio photographic lens according to the present invention, the entire optical system is divided into two groups with a diaphragm interposed therebetween, and each of the forward group and the rearward group comprises a lens group having at least one negative lens and having a composite positive refractive power, and when the shift from infinity photography to short distance photography is effected, the focusing is accomplished by widening the space between the forward and the rearward group while axially moving the entire system toward the object side. The photographic lens of the present invention satisfies the following conditions:

$$2.4 < f_1/f < 4.5 \tag{1}$$

$$2.5 < f_1/f_2 < 5.5 \tag{2}$$

where f is the total focal length of the entire system, $f_1$ is the focal length of the forward group and $f_2$ is the focal length of the rearward group.

By providing at least one negative lens in each of the positive forward and rearward groups, the present invention achieves achromatization in each group and varies the diaphragm space between the two groups during the focusing, thereby well correcting the aberration for the standard wavelength in a short distance photographing condition as well as chromatic aberration, particularly, off-axial chromatic aberration, in the balance with axial chromatic aberration. In the conventional floating systems, the partly movable lens has no degree of freedom of achromatism and the axial chromatic aberration and chromatic aberration off the axis cannot be corrected at the same time. The correction of such chromatic aberrations has been effected by resorting to variation in the other spaces than the diaphragm space and, therefore, the aberration for the standard wavelength could be corrected but it has been very difficult to well correct even the off-axial chromatic aberration. This has formed a hindrance in achieving an improved short distance performance by a simple construction in the conventional floating systems.

Also, in the present invention, the spacing between the two groups, namely, the diaphragm space, becomes great during short distance photography and therefore, where the diaphragm is provided integrally with the rearward group, the entrance pupil moves to a greater distance from the object and the angle which a light beam entering the lens system forms with the optical axis becomes small, thus facilitating the correction of aberrations, and where the diaphragm is provided integrally with the forward group, the exit pupil becomes more distant from the image and the angle of the light beam exitting from the lens system becomes small, thus again facilitating the correction of aberrations. Therefore, with the above-described correction of chromatic aberration as the basis, it is possible to well correct the aberrations at a short distance while keeping a great aperture ratio, by suitably balancing the refractive power distributions in the forward and rearward groups as follows.

The present invention does not aim at as high a magnification as that of a so-called microlens or a macrolens which is capable of proximity photography at high magnification, but aims at a greater aperture ratio. However, the photographic lens of the present invention is an optical system which is capable of photography at a magnification higher than that of ordinary lenses. In order to suppress the occurrence of spherical aberration and coma and to secure a sufficient back focal length for a single lens reflex camera, the ratio of the refractive power of the entire system to the refractive power of the forward group is made smaller than that in a lens which is also capable of high magnification proximity photography. Therefore, the forward group can be made into an optical system which itself is sufficiently bright and can stand use. Also, since the refractive power of the forward group is weak, the light beam leaving the object point on the optical axis, after having passed through the forward group, enters the rearward group as a divergent light beam at a photographing magnification considerably lower than that of a so-called microlens and, therefore, annular spherical aberration, coma and astigmatism are sharply increased. From the time when this light beam begins to become a divergent light beam, the burden of aberration correction begins to be imposed upon the rearward group and therefore, in order that the lens may be of a large aperture ratio, the photographing magnification thereof must be limited to a photographing magnification lower than that of the microlens. Thus, the refractive power distributions in the forward and rearward groups have been determined from such a point of view. That is, the condition in which this light beam which may become a divergent light beam becomes parallel to the optical axis or becomes a slightly divergent light beam is determined as the limit condition of the nearest distance.

As regards conditions (1) and (2) according to the present invention, when $f_2 = f_1$, $f_1 = \infty$ and the refractive power of the forward group becomes entirely null and this does not match the present invention, whereas such an area which is not realized is eliminated by the upper limit of condition (1).

Condition (1) prescribes the necessary distribution of refractive power for the lens to be of a large aperture ratio for a short distance object. If the lower limit of condition (1) is departed from, it will become difficult to secure a sufficient back focal length as the lens for a single lens reflex camera of large aperture ratio and also, regarding the aberrations, the refractive power of the forward group will become too strong and annular spherical aberration will become pronounced and thus, as a large aperture ratio lens, it will become difficult to effect sufficiently good aberration correction even for a short distance. Conversely, if the upper limit of condition (1) is exceeded, it will be easy to obtain a sufficient extent of diaphragm space, but the total length of the lens will become too great and this is disadvantageous in making the lens compact. Also, in the short distance condition, the light beam from the axial object, after having passed through the forward group, will become a more divergent light beam and therefore, the burden of aberration correction for the rearward group will be increased. In order to sufficiently correct the aberrations such as annular spherical aberration, extroversive coma, astigmatism and curvature of image field, a complicated lens construction must be adopted for the rearward group and this is again disadvantageous in making the lens compact.

Also, generally in a lens system of large aperture ratio, the aperture of each lens is necessarily large and the edge thickness of each lens must also be secured sufficiently and necessarily, the center thickness of each lens also necessarily becomes great and the principal point of the lens is apt to come into the interior of the lens. In the present invention, the diaphragm space varies and becomes smallest during infinity photography and therefore, contrivance has been made to secure the diaphragm space by said conditions (1) and (2).

Condition (2) is concerned with the ratio of the refractive power of the rearward group to the refractive power of the forward group and, like condition (1), it is a condition for determining a proper refractive power distribution, as well as a condition complementary to condition (1) and necessary to sufficiently secure the extent of the diaphragm space and the back focal length. If the lower limit of condition (2) is exceeded, the refractive power of the first group will become strong and the forward group will become unable to stand a bright use condition and the correction of various aberrations will become difficult, and both the diaphragm space and the back focal length will undesirably become short.

If the upper limit of condition (2) is exceeded, the refractive power of the first group will become too weak as in the case where the upper limit of condition (1) is exceeded and therefore, the light beam leaving the object point on the optical axis, after having passed through the forward group, will enter the rearward group as a divergent light beam at a low photographing magnification and thus, the aberration correction in the rearward group will become difficult and this is undesirable.

In the optical system as described above which comprises positive forward and rearward groups, when the average refractive index of the glass forming the positive lens in the forward group is N, the value of N should desirably be within the range of $1.75 < N < 1.81$. The upper limit of this range is provided for because there is no glass of low dispersion and higher refractive index, and the lower limit is provided for because the correction of astigmatism, curvature of image field and spherical aberration becomes difficult. Also, when the Abbe number of the glass forming the negative lens in the forward group is $\nu$, the value of $\nu$ should desirably be within the range of $29.6 < \nu < 59$. The lower limit of this range is provided for because the refractive power of flint glass is high and the correction of astigmatism and curvature of image field becomes difficult in the great aperture ratio lens of this type. The upper limit is provided for because the refractive index begins to become low and the correction of annular spherical aberration becomes difficult and the on-axial achromatization by the forward group becomes deficient.

Next, assuming that when the shift from an infinity hotography condition to a short distance photography condition is effected, the amount of variation in diaphragm space is y and the amount of variation in back focal length is x, the lens is focused while keeping a functional relation that $y=f(x)$. At this time, the first order differentiated value $dy/dx$ should desirably be within the range of $0.2<dy/dx<0.6$. The origin of the coordinates of the function is always the infinity photography condition. If the lower limit of this range is exceeded, the imaging characteristic of the lens will become approximate to the imaging characteristic during short distance photography by the whole axial movement system and the effect of the present invention cannot be obtained. If the upper limit of this range is exceeded, spherical aberration, coma and astigmatism will become overcorrected conversely to the case where floating does not take place, and it will become difficult to realize a desirable aberration balance.

In the above-described construction of the present invention, a lens system of the so-called deformed Gauss type is adopted specifically. That is, as shown in FIGS. 1A, 1B, 3A, 3B, 5A and 5B, the forward group $G_1$ comprises, in succession from the object side, a first positive lens $L_1$, a positive meniscus lens $L_2$ having its convex surface facing the object side, and a negative meniscus lens $L_3$ having its convex surface facing the object side, and the rearward group $G_2$ comprises a meniscus lens $L_4$ consisting of a negative lens and a positive lens cemented together and having its concave surface facing the object side, and a second positive lens $L_5$, and a third positive lens $L_6$ is further provided in the rearward group $G_2$ to make the lens system brighter.

In such a specific construction, if the shape factor of the first positive lens $L_1$ in the forward group which is most adjacent to the object side is $\delta=(r_2+r_1)/(r_2-r_1)$ ($r_1$ is the radius of curvature of the front surface of this lens $L_1$ and $r_2$ is the radius of curvature of the rear surface of the lens $L_1$), it is desirable that $\delta$ be within the range of $0.9<\delta<1.3$. If the lower limit of this range is exceeded, astigmatism will be negatively too great and coma will also be great, and if the upper limit of this range is exceeded, astigmatism will be negatively too great and the balance cannot be maintained more remarkably during near distance photography than during infinity photography, and this is not desirable.

Also, if the refractive index of the positive meniscus lens $L_2$ in the forward group is $N_2$ and the refractive index of the negative meniscus lens $L_3$ is $N_3$, it is desirable to provide the relation that $N_2>N_3$. A large aperture ratio lens uses glass of high refractive index and the refractive power of the negative lens component thereof is weak. Therefore, the Petzval sum becomes excessively positive and astigmatic difference is apt to occur, and it is desirable to reduce the Petzval sum by so using glass of low refractive index for the negative lens and to intensify this tendency in a range in which annular spherical aberration does not occur. Further, in this case, the negative lens is one of low refractive index and therefore, glass of low dispersion can be used, whereby the off-axial chromatic aberration can be displaced in the positive direction at the short distance and the fluctuation of the off-axial chromatic aberration during infinity photography and near distance photography can be corrected to a smaller value and this is desirable.

Figure 1A:
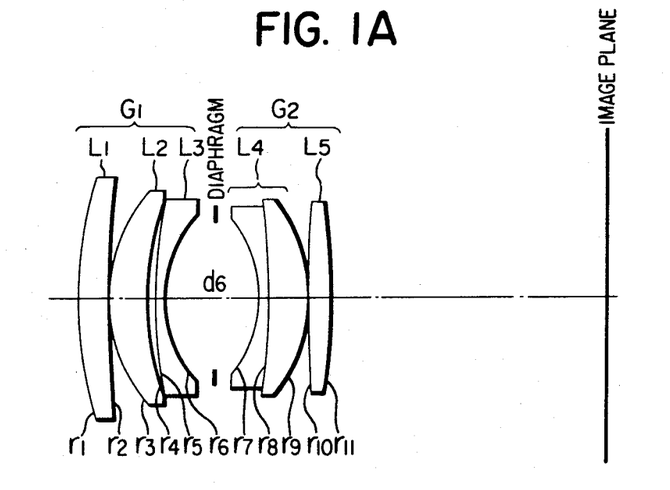
FIG. 1A shows the lens arrangement of a first embodiment of the present invention during infinity photography condition.
Figure 1B:
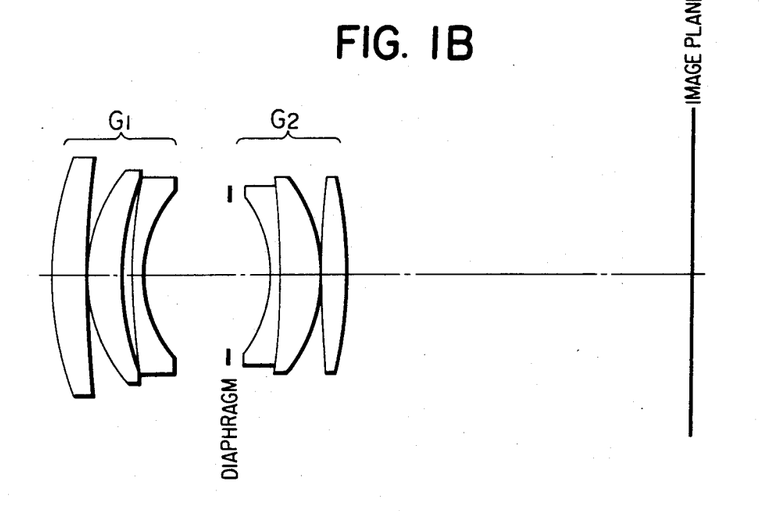
FIG. 1B shows the lens arrangement of the first embodiment during near distance object photography condition.
Figure 2A:
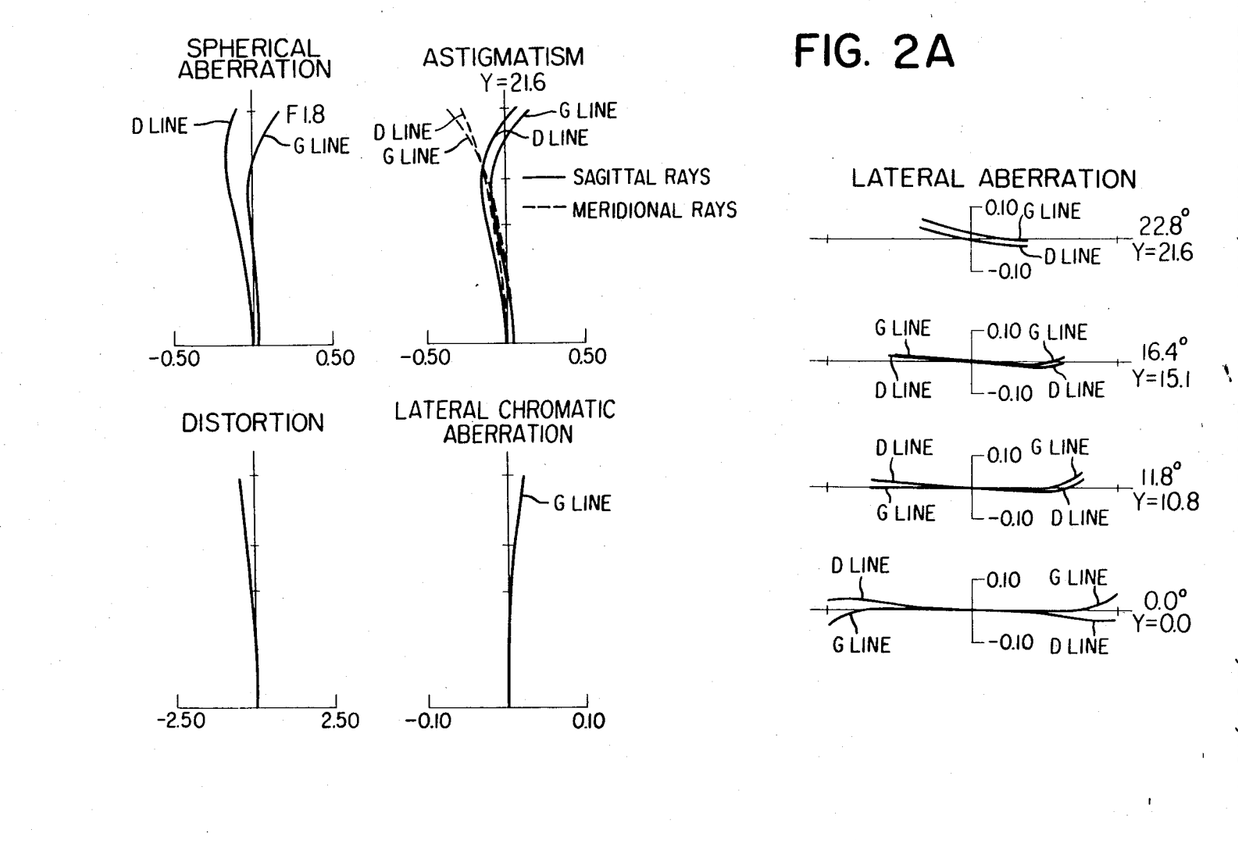
FIG. 2A illustrates the aberrations in the first embodiment during infinity object photography.
Figure 2B:
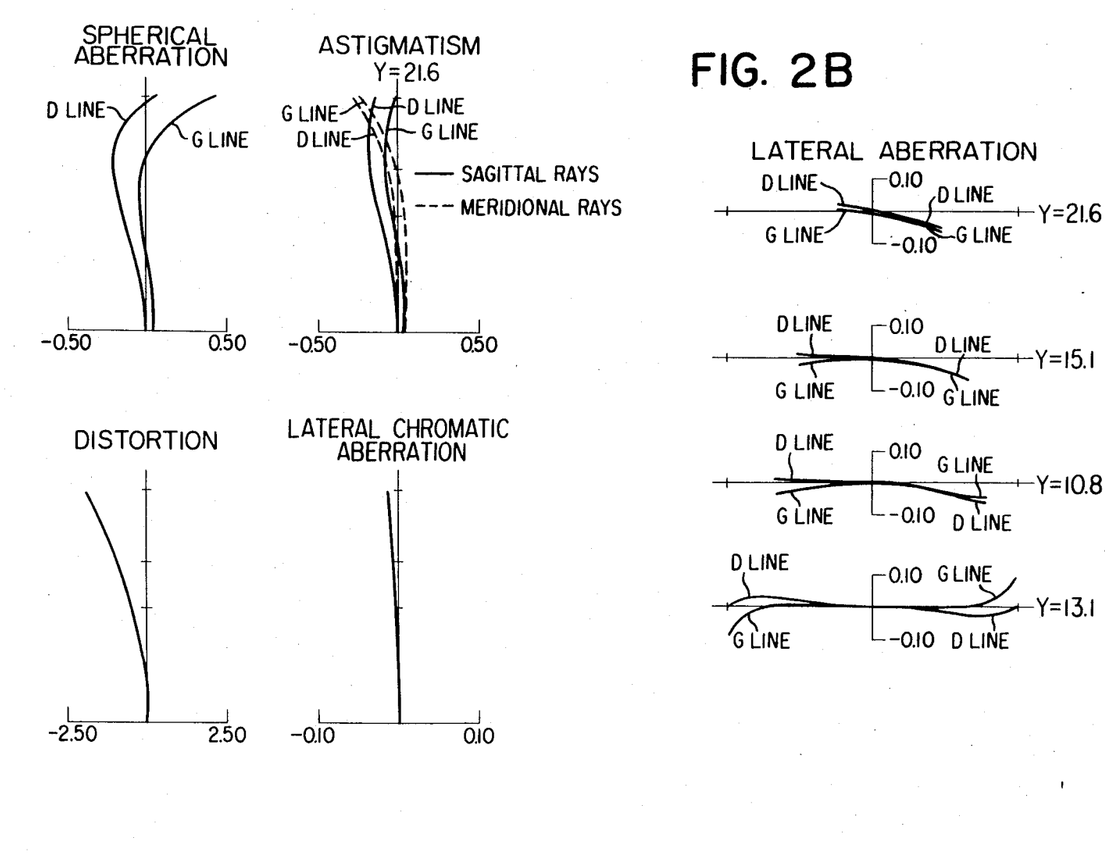
FIG. 2B illustrates the aberrations in the first embodiment when the object distance $d_o = 286.9196$ and the photographing magnification $\beta = -0.2$.

Embodiments of the present invention will hereinafter be described. All of the embodiments are for use with 35 mm cameras, and the diaphragm is designed to move always with the rearward group. The focal length is $f=51.6$ and the total angle of view is $2\omega=45.43°$. In a first embodiment, F-number is 1.8, and FIG. 1A shows the lens arrangement during an infinity photography condition and FIG. 1B shows the lens arrangement during near distance object photography. The numerical data of the first embodiment are shown in Table 1, and the aberrations thereof are illustrated in FIG. 2. FIG. 2A illustrates the aberrations during infinity object photography, and FIG. 2B illustrates the aberrations when the object distance $d_o=286.9196$ and the photographing magnification $\beta=-0.2$. The first embodiment is an embodiment in which the average variation rate regarding the floating is $\Delta y/\Delta x=0.4764$ and the refractive power of the forward group is relatively strong. Also, in spite of the floating taking place, the variation in chromatic aberration off the axis could be minimized to the same degree as that of the conventional whole axial movement system.

Figure 3A:
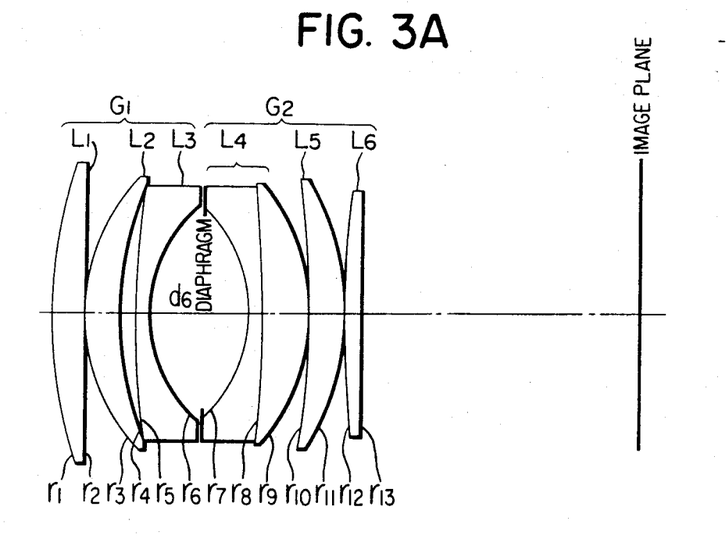
FIG. 3A shows the lens arrangement of a second embodiment during infinity photography condition.
Figure 3B:
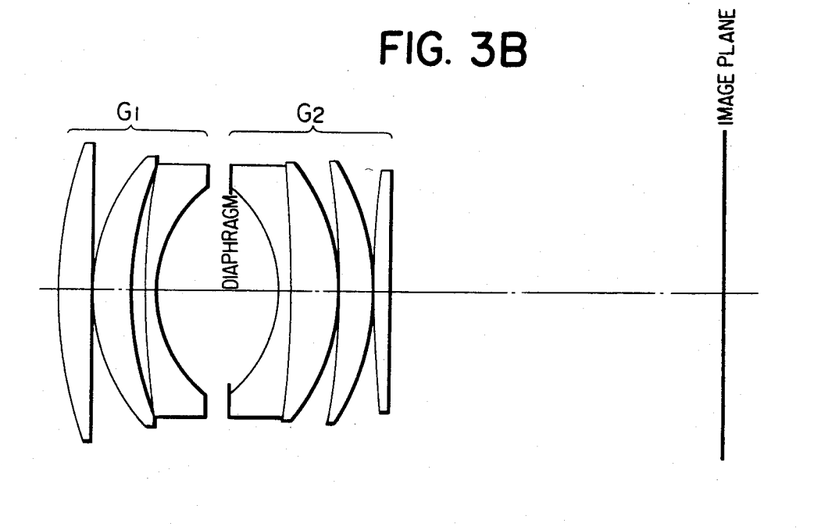
FIG. 3B shows the lens arrangement of the second embodiment during near distance object photography condition.
Figure 4A:
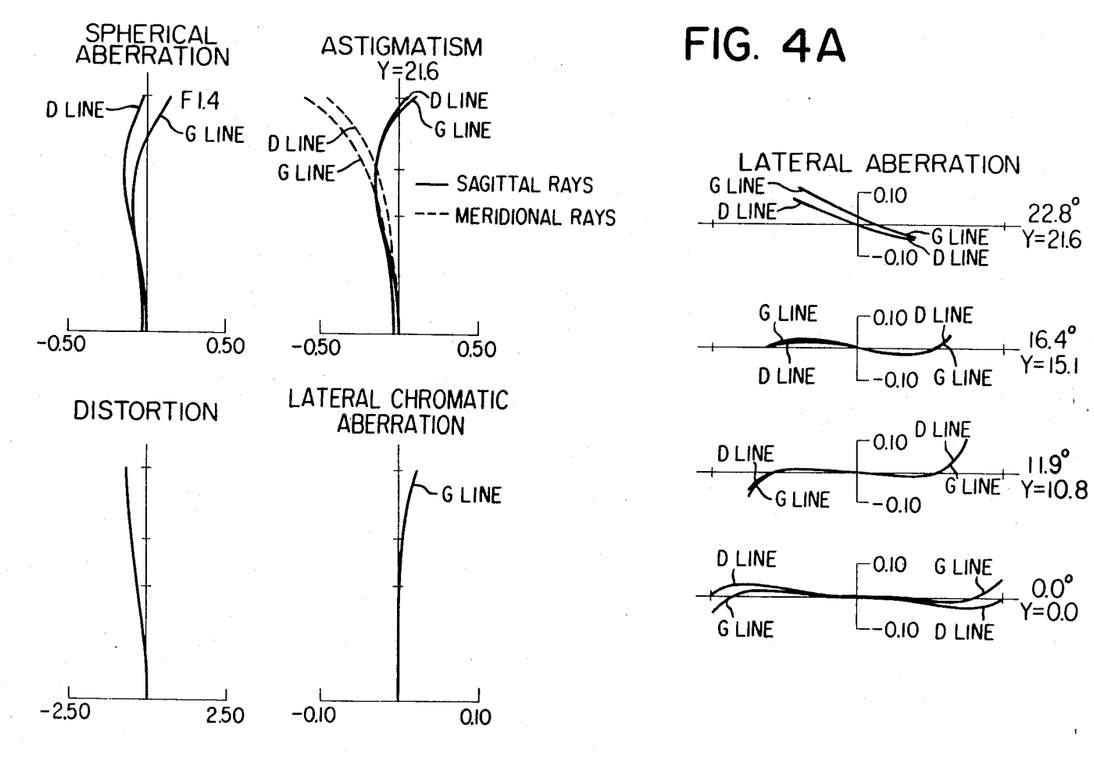
FIG. 4A illustrates the aberrations in the second embodiment during infinity object photography.
Figure 4B:
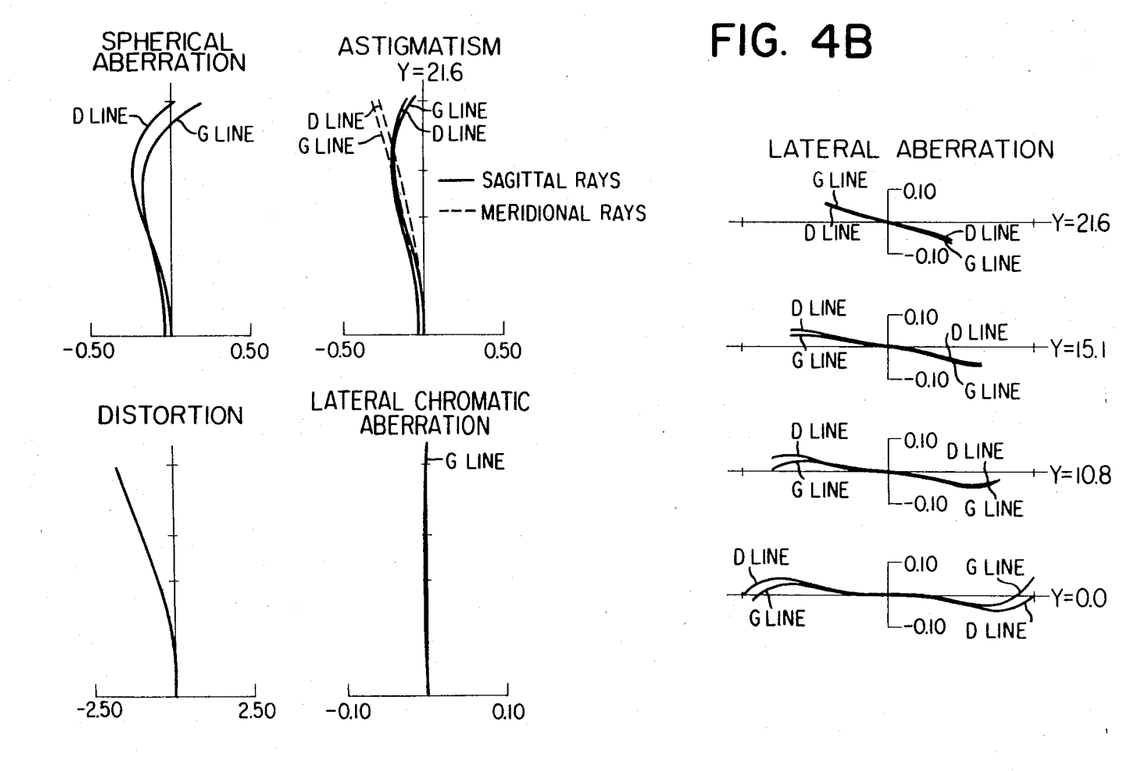
FIG. 4B illustrates the aberrations in the second embodiment when the object distance $d_o = 364.224$ and the photographing magnification $\beta = -0.15$.

A second embodiment is one in which, as shown in FIG. 3, a positive meniscus lens $L_6$ is added to the rearward group to provide a greater aperture ratio. This also adopts the modified Gauss type, and FIG. 3A shows the lens arrangement during infinity photography condition and FIG. 3B shows the lens arrangement during near distance object photography. In this embodiment, F-number is 1.4 and therefore, the length of the short distance is greater than that in the first embodiment. The numerical data of the second embodiment are shown in Table 2 and the aberrations thereof are illustrated in FIGS. 4A and 4B. FIG. 4A illustrates the aberrations during infinity object photography, and FIG. 4B illustrates the aberrations when the object distance $d_o=364.224$ and the photographing magnification $\beta=-0.15$. The average variation rate regarding the floating is $\Delta y/\Delta x=0.3915$. Also, in this embodiment, distortion is well corrected in spite of it being a large aperture ratio lens. This is because distortion is caused to occur in the positive direction by the refractive power and shape of the positive lens group in the forward group to thereby reduce the distortion as the entire system.

Figure 5A:
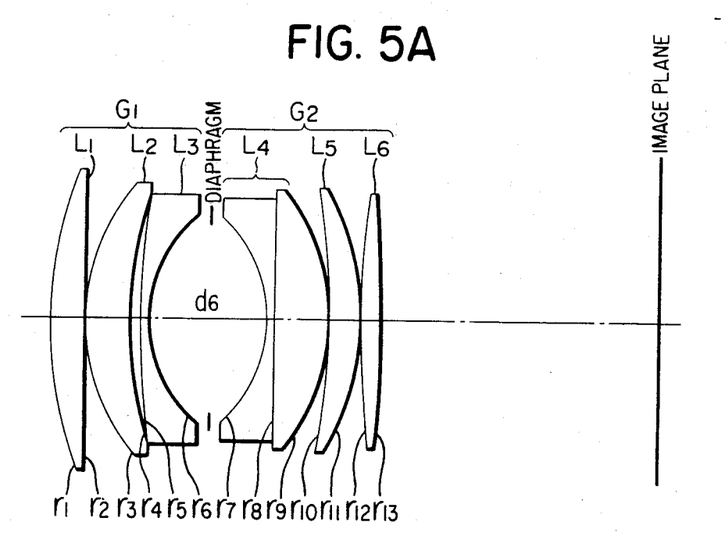
FIG. 5A shows the lens arrangement of a third embodiment during infinity photography condition.
Figure 5B:
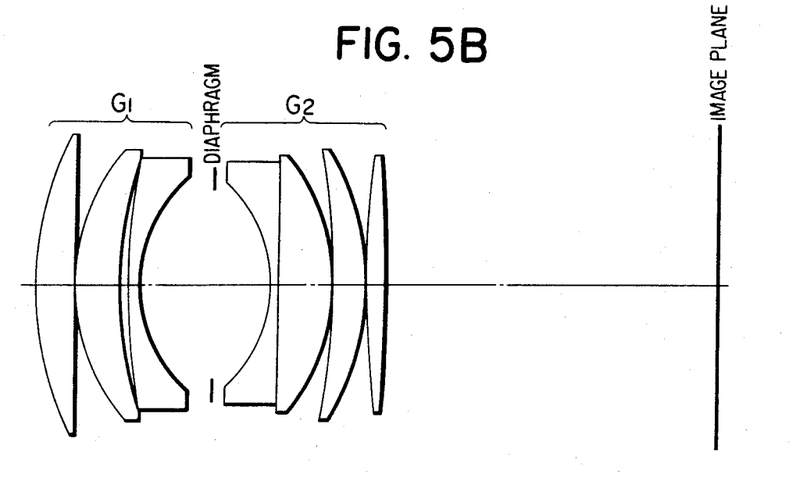
FIG. 5B shows the lens arrangement of the third embodiment during near distance object photography condition.
Figure 6A:
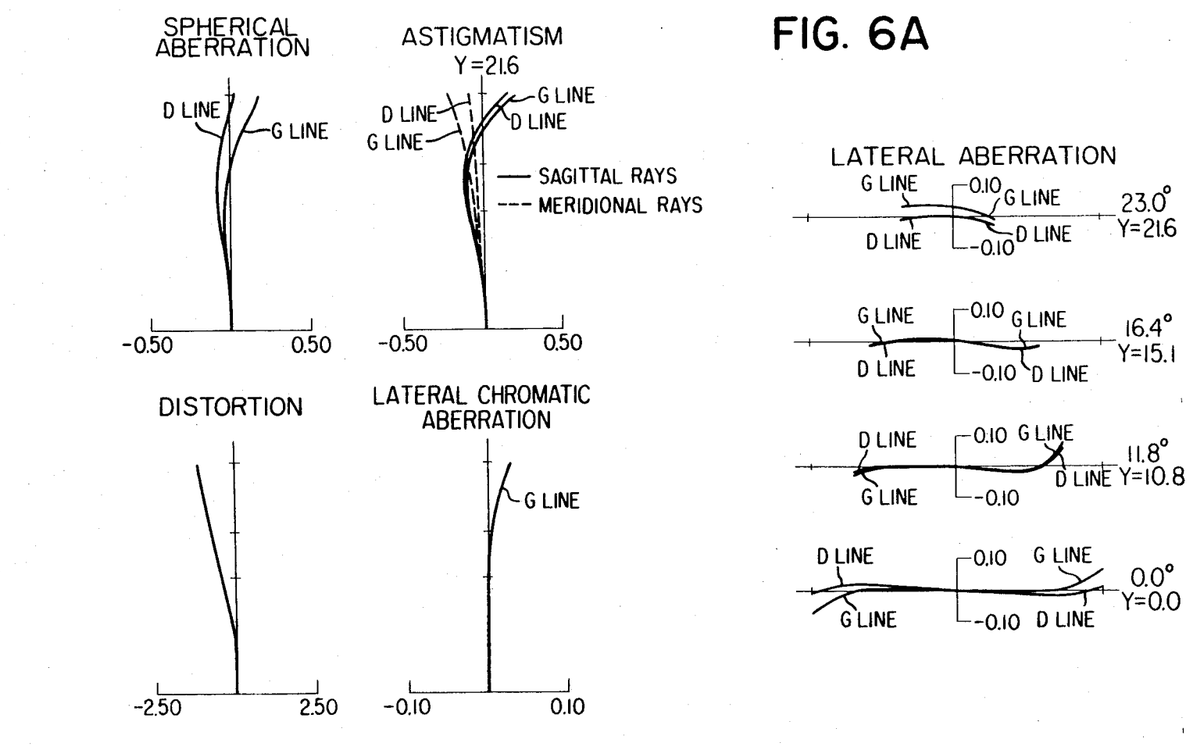
FIG. 6A illustrates the aberrations in the third embodiment during infinity object photography.
Figure 6B:
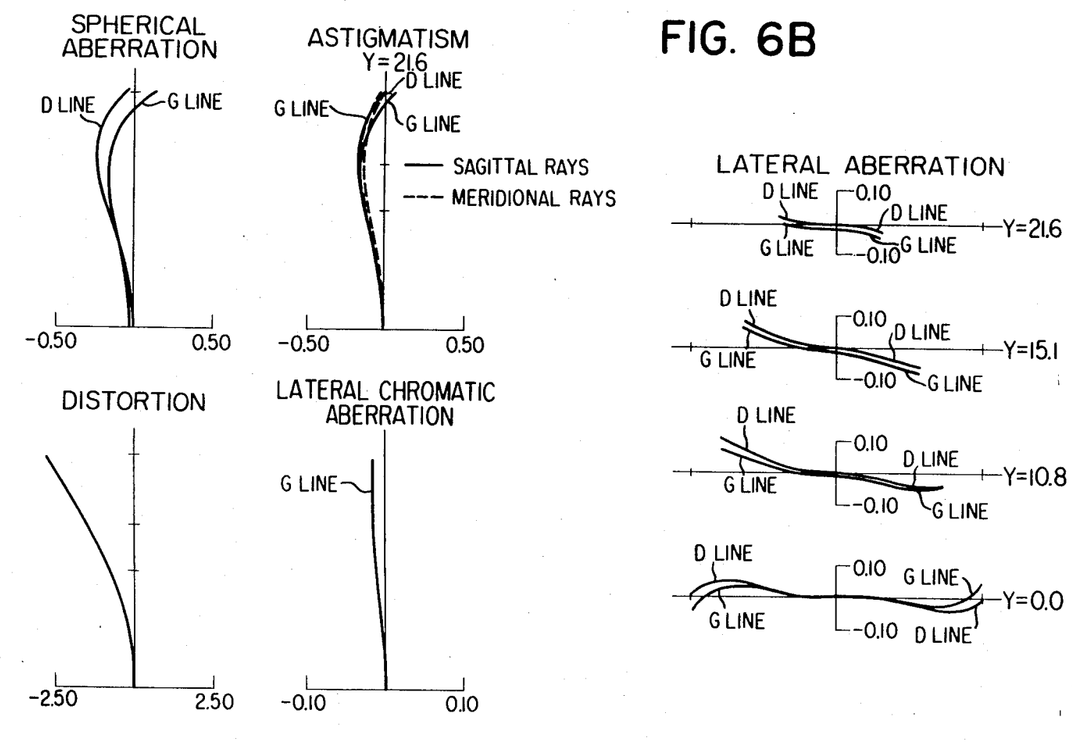
FIG. 6B illustrates the aberrations in the third embodiment when the object distance $d_o = 354.649$ and the photographing magnification $\beta = -0.15$.

A third embodiment, as shown in FIGS. 5A and 5B, adopts the modified Gauss type similar to the second embodiment. FIG. 5A shows the lens arrangement during infinity photography condition, and FIG. 5B shows the lens arrangement during near distance object photography. As in the second embodiment, F-number is 1.4. The numerical data of the third embodiment are shown in Table 3, and the aberrations thereof are illustrated in FIGS. 6A and 6B. FIG. 6A illustrates the aberrations during infinity object photography, and FIG. 6B illustrates the aberrations when the object distance $d_o=354.649$ and the photographing magnification $\beta=-0.15$. The third embodiment is an embodiment in which the average variation rate regarding the floating is $\Delta y/\Delta x=0.2306$ and the refractive power of the forward group inclines toward a relatively weak direction.

TABLE 1
(First Embodiment)

Focal length f = 51.6   F-number 1.8
Angle of view 2ω = 45.43°

Forward Group $G_1$

| | | | |
|---|---|---|---|
| $r_1$ = 45.900 | $d_1$ = 4.6 | $n_1$ = 1.80411 | $v_1$ = 46.4 |
| $r_2$ = 353.259 | $d_2$ = 0.1 | | |
| $r_3$ = 21.215 | $d_3$ = 4.7 | $n_2$ = 1.71300 | $v_2$ = 54.0 |
| $r_4$ = 35.262 | $d_4$ = 1.4 | | |
| $r_5$ = 63.100 | $d_5$ = 1.1 | $n_3$ = 1.67270 | $v_3$ = 32.2 |
| $r_6$ = 16.120 | | | |
| | $d_6$ = Variable | | |

Rearward Group $G_2$

| | | | |
|---|---|---|---|
| $r_7$ = −16.588 | $d_7$ = 1.3 | $n_4$ = 1.74000 | $v_4$ = 28.3 |
| $r_8$ = −100.000 | $d_8$ = 5.4 | $n_5$ = 1.76684 | $v_5$ = 46.8 |
| $r_9$ = −20.429 | $d_9$ = 0.1 | | |
| $r_{10}$ = 204.300 | $d_{10}$ = 3.45 | $n_6$ = 1.80411 | $v_6$ = 46.4 |
| $r_{11}$ = −54.861 | | | |

When the object distance $d_0$ = ∞, $d_6$ = 12.867
When the object distance $d_0$ = 286.916, $d_6$ = 17.622
Photographing magnification β = −0.2
 The diaphragm lies 5.8 ahead of the foremost lens surface of the rearward group $G_2$.
  $f_1$ = 132.289   δ = 1.299
  $f_2$ = 48.279
  $f_1/f$ = 2.564
  $f_1/f_2$ = 2.740

TABLE 2
(Second Embodiment)

Focal length f = 51.6   F-number 1.4
Angle of view 2ω = 45.43°

Forward Group $G_1$

| | | | |
|---|---|---|---|
| $r_1$ = 59.500 | $d_1$ = 4.5 | $n_1$ = 1.77279 | $v_1$ = 49.4 |
| $r_2$ = 4804.893 | $d_2$ = 0.15 | | |
| $r_3$ = 25.448 | $d_3$ = 5.0 | $n_2$ = 1.80411 | $v_2$ = 46.4 |
| $r_4$ = 43.781 | $d_4$ = 1.8 | | |
| $r_5$ = 78.162 | $d_5$ = 1.8 | $n_3$ = 1.64831 | $v_3$ = 33.8 |
| $r_6$ = 17.822 | | | |
| | $d_6$ = Variable | | |

Rearward Group $G_2$

| | | | |
|---|---|---|---|
| $r_7$ = −17.711 | $d_7$ = 1.65 | $n_4$ = 1.75520 | $v_4$ = 27.6 |
| $r_8$ = −200.000 | $d_8$ = 6.15 | $n_5$ = 1.78797 | $v_5$ = 47.5 |
| $r_9$ = −26.332 | $d_9$ = 0.15 | | |
| $r_{10}$ = −135.239 | $d_{10}$ = 4.6 | $n_6$ = 1.77279 | $v_6$ = 49.4 |
| $r_{11}$ = −33.578 | $d_{11}$ = 0.2 | | |
| $r_{12}$ = 124.264 | $d_{12}$ = 2.15 | $n_7$ = 1.80411 | $v_7$ = 46.4 |
| $r_{13}$ = −82604.571 | | | |

When the object distance $d_0$ = ∞, $d_6$ = 13.623
When the object distance $d_0$ = 364.224, $d_6$ = 16.577
Photographing magnification β = −0.15
 The diaphragm lies 6.4 ahead of the foremost lens surface of the rearward group $G_2$.
  $f_1$ = 146.0   δ = 1.025
  $f_2$ = 45.369
  $f_1/f$ = 2.829
  $f_1/f_2$ = 3.218

TABLE 3
(Third Embodiment)

Focal length f = 51.6   F-number 1.4
Angle of view 2ω = 45.43°

Forward Group $G_1$

| | | | |
|---|---|---|---|
| $r_1$ = 45.529 | $d_1$ = 4.8 | $n_1$ = 1.74400 | $v_1$ = 45.1 |
| $r_2$ = 490.732 | $d_2$ = 0.1 | | |
| $r_3$ = 27.052 | $d_3$ = 5.9 | $n_2$ = 1.79631 | $v_2$ = 41.0 |
| $r_4$ = 46.072 | $d_4$ = 1.3 | | |
| $r_5$ = 87.913 | $d_5$ = 1.6 | $n_3$ = 1.69895 | $v_3$ = 30.1 |
| $r_6$ = 17.602 | | | |
| | $d_6$ = Variable | | |

Rearward Group $G_2$

| | | | |
|---|---|---|---|
| $r_7$ = −17.356 | $d_7$ = 1.0 | $n_4$ = 1.72825 | $v_4$ = 28.3 |
| $r_8$ = −500.0 | $d_8$ = 7.0 | $n_5$ = 1.80411 | $v_5$ = 46.4 |
| $r_9$ = −26.968 | $d_9$ = 0.2 | | |
| $r_{10}$ = −94.634 | $d_{10}$ = 4.4 | $n_6$ = 1.71300 | $v_6$ = 54.0 |
| $r_{11}$ = −31.468 | $d_{11}$ = 0.1 | | |
| $r_{12}$ = 114.654 | $d_{12}$ = 2.5 | $n_7$ = 1.76684 | $v_7$ = 46.8 |
| $r_{13}$ = −260.047 | | | |

When the object distance $d_0$ = ∞ $d_6$ = 16.121
When the object distance $d_0$ = 354.649, $d_6$ = 17.894
Photographing magnification β = −0.15
 The diaphragm lies 7.7 ahead of the foremost lens surface of the rearward group $G_2$.
  $f_1$ 32 177.786   δ = 1.205
  $f_2$ = 41.768
  $f_1/f$ = 3.445
  $f_1/f_2$ = 4.257

According to the present invention having the construction as described above, there is provided a large aperture ratio photographic lens which has a standard angle of view as a lens for a single lens reflex camera and yet in which the deterioration of chromatic aberration and various aberrations during short distance photography is small and the photographing near distance is shorter than in the conventional lenses.

I claim:

1. In a large aperture ratio photographic lens with means for correcting aberrations comprising a forward group including at least one negative lens and having a composite positive refractive power, a rearward group also including at least one negative lens and having a composite positive refractive power, and a diaphragm provided between said two groups, the improvement residing in that during the shift from an infinity object photography condition to a short distance object photography condition, focusing is effected by moving both of said two groups toward the object side while enlarging the diaphragm space between said two groups and that said photographic lens satisfies the following conditions:

$$2.4 < f_1/f < 4.5 \tag{1}$$

$$2.5 < f_1/f_2 < 5.5 \tag{2}$$

where f is the total focal length of the entire system during the infinity photography condition, $f_1$ is the focal length of said forward group, and $f_2$ is the focal length of said rearward group.

2. A photographic lens according to claim 1, further satisfying the following conditions:

$$1.75 < N < 1.81$$

$$29.6 < v < 59$$

where N is the average refractive index of the glass of the positive lens in said forward group, and $v$ is the Abbe number of the glass of the negative lens in said forward group.

3. A photographic lens according to claim 2, wherein the amount of variation, y, in the diaphragm space between said two groups and the amount of variation, x, in the back focal length have a functional relationship y=f(x) with the infinity photography condition being at y=0 and x=0 such that when the shift from the infinity photography condition to the near distance photography condition takes place, the first-order differentiated value dy/dx of said functional relationship is in the range of $$0.2 < dy/dx < 0.6.$$

4. A photographic lens according to claim 3, wherein said forward group includes, in succession from the object side, a positive lens, a positive meniscus lens having its convex surface facing the object side, and a negative meniscus lens having its convex surface facing the object side, and said rearward group includes, in succession from the object side, a meniscus lens comprising a negative lens and a positive lens cemented together and having its concave surface facing the object side, and at least one positive lens.

5. A photographic lens according to claim 4, wherein when the curvature radii of the front and rear surfaces of the positive lens in said forward group which is most adjacent to the object side are $r_1$ and $r_2$, respectively, the shape factor defined as $\delta=(r_2+r_1)/(r_2-r_1)$ satisfies the condition that $0.9<\delta<1.3$.

6. A photographic lens according to claim 5, wherein numerical data are as follows:

| Focal length f = 51.6 | | F-number 1.8 | |
|---|---|---|---|
| Angle of view $2\omega = 45.43°$ | | | |
| Forward Group $G_1$ | | | |
| $r_1 = 45.900$ | $d_1 = 4.6$ | $n_1 = 1.80411$ | $\nu_1 = 46.4$ |
| $r_2 = 353.259$ | $d_2 = 0.1$ | | |
| $r_3 = 21.215$ | $d_3 = 4.7$ | $n_2 = 1.71300$ | $\nu_2 = 54.0$ |
| $r_4 = 35.262$ | $d_4 = 1.4$ | | |
| $r_5 = 63.100$ | $d_5 = 1.1$ | $n_3 = 1.67270$ | $\nu_3 = 32.2$ |
| $r_6 = 16.120$ | | | |
| | $d_6$ = Variable | | |
| Rearward Group $G_2$ | | | |
| $r_7 = -16.588$ | $d_7 = 1.3$ | $n_4 = 1.74000$ | $\nu_4 = 28.3$ |
| $r_8 = -100.000$ | $d_8 = 5.4$ | $n_5 = 1.76684$ | $\nu_5 = 46.8$ |
| $r_9 = -20.429$ | $d_9 = 0.1$ | | |
| $r_{10} = 204.300$ | $d_{10} = 3.45$ | $n_6 = 1.80411$ | $\nu_6 = 46.4$ |
| $r_{11} = -54.861$ | | | | wherein when the object distance $d_0 = \infty$, $d_6 = 12.867$ and when the object distance $d_0 = 286.916$, $d_6 = 17.622$, Photographing magnification $\beta = -0.2$, and wherein the diaphragm lies 5.8 ahead of the foremost lens surface of the rearward group $G_2$, and

| $f_1 = 132.289$ | $\delta = 1.299$ |
|---|---|
| $f_1 = 48.279$ | |
| $f_1/f = 2.564$ | |
| $f_1/f_2 = 2.740$ | | wherein r represents the radius of curvature of each lens surface, d represents the center thickness of each lens and the air space between adjacent lenses, n and $\nu$ represent refractive index and Abbe number, respectively, and the subscripts represent the order from the object side.

7. A photographic lens according to claim 5, wherein numerical data are as follows:

| Focal length f = 51.6 | | F-number 1.4 | |
|---|---|---|---|
| Angle of view $2\omega = 45.43°$ | | | |
| Forward Group $G_1$ | | | |
| $r_1 = 59.500$ | $d_1 = 4.5$ | $n_1 = 1.77279$ | $\nu_1 = 49.4$ |
| $r_2 = 4804.893$ | $d_2 = 0.15$ | | |
| $r_3 = 25.448$ | $d_3 = 5.0$ | $n_2 = 1.80411$ | $\nu_2 = 46.4$ |
| $r_4 = 43.781$ | $d_4 = 1.8$ | | |
| $r_5 = 78.162$ | $d_5 = 1.8$ | $n_3 = 1.64831$ | $\nu_3 = 33.8$ |
| $r_6 = 17.822$ | | | |
| | $d_6$ = Variable | | |
| Rearward Group $G_2$ | | | |
| $r_7 = -17.711$ | $d_7 = 1.65$ | $n_4 = 1.75520$ | $\nu_4 = 27.6$ |
| $r_8 = -200.000$ | $d_8 = 6.15$ | $n_5 = 1.78797$ | $\nu_5 = 47.5$ |
| $r_9 = -26.332$ | $d_9 = 0.15$ | | |
| $r_{10} = -135.239$ | $d_{10} = 4.6$ | $n_6 = 1.77279$ | $\nu_6 = 49.4$ |
| $r_{11} = -33.578$ | $d_{11} = 0.2$ | | |
| $r_{12} = 124.264$ | $d_{12} = 2.15$ | $n_7 = 1.80411$ | $\nu_7 = 46.4$ |
| $r_{13} = -82604.571$ | | | | wherein when the object distance $d_0 = \infty$, $d_6 = 13.623$ and when the object distance $d_0 = 364.224$, $d_6 = 16.577$, Photographing magnification $\beta = -0.15$, and wherein the diaphragm lies 6.4 ahead of the foremost lens surface of the rearward group $G_2$, and

| $f_1$ 32 146.0 | $\delta = 1.025$ |
|---|---|
| $f_2 = 45.369$ | |
| $f_1/f = 2.829$ | |
| $f_1/f_2 = 3.218$ | | wherein r represents the radius of curvature of each lens surface, d represents the center thickness of each lens and the air space between adjacent lenses, n and $\nu$ represent refractive index and Abbe number, respectively, and the subscripts represent the order from the object side.

8. A photographic lens according to claim 5, wherein numerical data are as follows:

| Focal length f = 51.6 | | F-number 1.4 | |
|---|---|---|---|
| Angle of view $2\omega = 45.43°$ | | | |
| Forward Group $G_1$ | | | |
| $r_1 = 45.529$ | $d_1 = 4.8$ | $n_1 = 1.74400$ | $\nu_1 = 45.1$ |
| $r_2 = 490.732$ | $d_2 = 0.1$ | | |
| $r_3 = 27.052$ | $d_3 = 5.9$ | $n_2 = 1.79631$ | $\nu_2 = 41.0$ |
| $r_4 = 46.072$ | $d_4 = 1.3$ | | |
| $r_5 = 87.913$ | $d_5 = 1.6$ | $n_3 = 1.69895$ | $\nu_3 = 30.1$ |
| $r_6 = 17.602$ | | | |
| | $d_6$ = Variable | | |
| Rearward Group $G_2$ | | | |
| $r_7 = -17.356$ | $d_7 = 1.0$ | $n_4 = 1.72825$ | $\nu_4 = 28.3$ |
| $r_8 = -500.0$ | $d_8 = 7.0$ | $n_5 = 1.80411$ | $\nu_5 = 46.4$ |
| $r_9 = -26.968$ | $d_9 = 0.2$ | | |
| $r_{10} = -94.634$ | $d_{10} = 4.4$ | $n_6 = 1.71300$ | $\nu_6 = 54.0$ |
| $r_{11} = -31.468$ | $d_{11} = 0.1$ | | |
| $r_{12} = 114.654$ | $d_{12} = 2.5$ | $n_7 = 1.76684$ | $\nu_7 = 46.8$ |
| $r_{13} = -260.047$ | | | | wherein when the object distance $d_0 = \infty$ $d_6 = 16.121$ and when the object distance $d_0 = 354.649$ $d_6 = 17.894$, Photographing magnification $\beta = -0.15$, and wherein the diaphragm lies 7.7 ahead of the foremost lens surface of the rearward group $G_2$, and

| $f_1 = 177.786$ | $\delta = 1.205$ |
|---|---|
| $f_2 = 41.768$ | |
| $f_1/f = 3.445$ | |
| $f_1/f_2 = 4.257$ | | wherein r represents the radius of curvature of each lens surface, d represents the center thickness of each lens and the air space between adjacent lenses, n and $\nu$ represent refractive index and Abbe number, respectively, and the subscripts represent the order from the object side.

* * * * *